March 1, 1960  H. A. ACKERMAN  2,926,842
APPARATUS FOR DETERMINING HORIZONTAL
AND VERTICAL GRADIENTS OF GRAVITY
Filed March 27, 1957
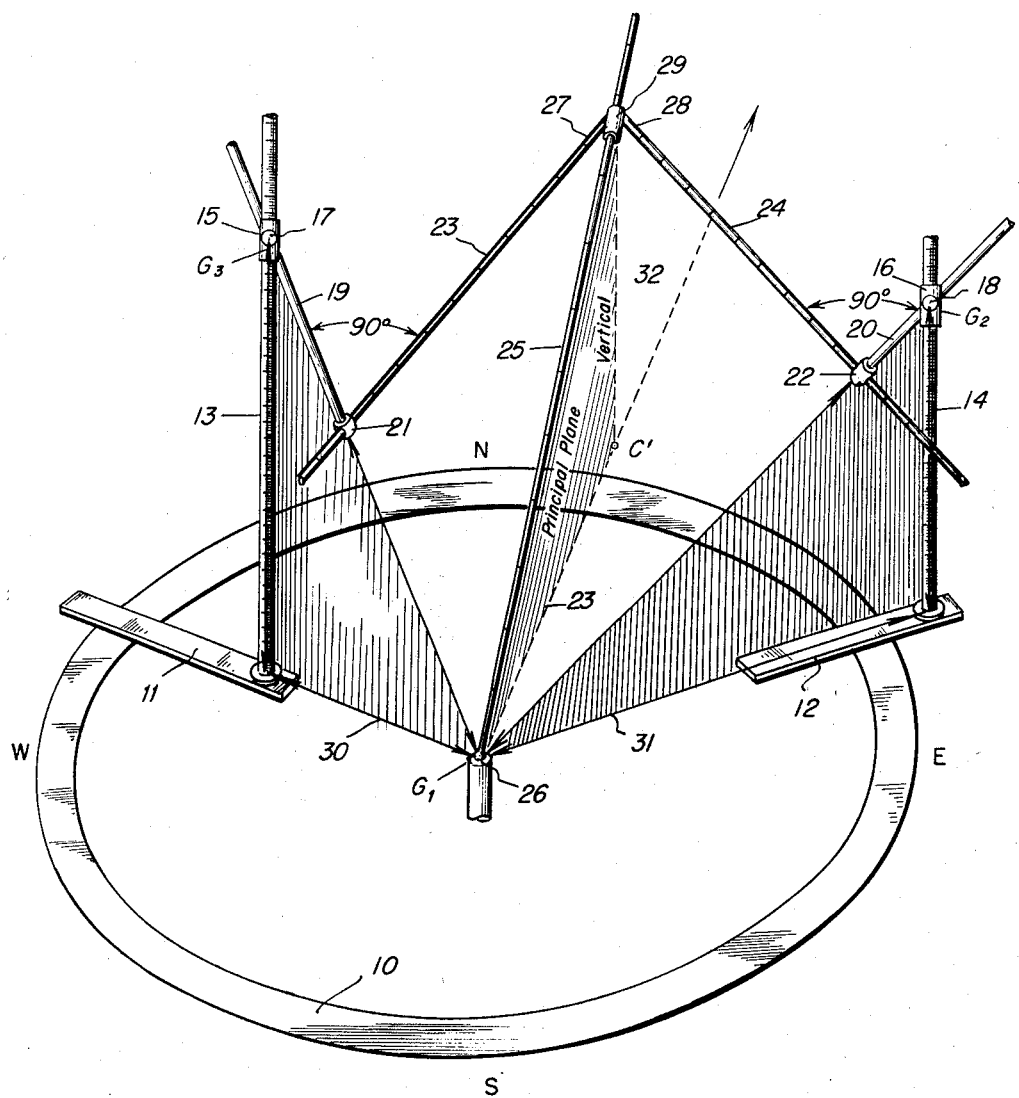
INVENTOR.
Herman A. Ackerman.
BY
James Y. Cleveland.
Attorney

2,926,842

APPARATUS FOR DETERMINING HORIZONTAL AND VERTICAL GRADIENTS OF GRAVITY

Herman A. Ackerman, New York, N.Y., assignor to Socony Mobil Oil Company, Inc., New York, N.Y., a corporation of New York Application March 27, 1957, Serial No. 648,842

1 Claim. (Cl. 235—61)

This invention relates generally to geophysical prospecting and, more particularly to a method and apparatus for determining both horizontal and vertical gradients of gravity for the purpose of locating subsurface anomalies which may trap oil in commercially produceable quantities.

The gravity meter has been used for many years to make regional surveys by measuring gravity at a plurality of stations usually spaced at intervals of approximately one mile. From these measurements the horizontal gradients of gravity were determined.

The present invention provides a simple and economical method and apparatus for determining both the horizontal and vertical gradients of gravity in the vicinity of a single station while using a conventional gravity meter. This is accomplished by establishing a base station and two additional stations that are each spaced from 50 to 100 feet in two different directions from the base station. For the operation of the instant invention one of the offset stations should be from 6 to 12 feet higher in elevation than the others. If natural terrain does not provide for this, then a tripod or other supporting means for the gravity meter can be used. The readings from these three stations may then be corrected for the Bouguer, free air, latitude, tidal, and terrain effects and then set up in the novel apparatus, forming a part of this invention, and the vertical and horizontal gradients measured directly.

Therefore, the primary object of this invention is to provide a novel method and apparatus for measuring the horizontal and vertical gradients of gravity in the vicinity of a single station while using a single conventional gravity meter. Another object of this invention is to provide a novel apparatus with which the readings made at the three adjacent stations can be set up to indicate directly the values of the horizontal and vertical gradients of gravity.

Other objects and advantages of the present invention will become apparent from the following detailed description when considered with the drawings, in which the single figure is a perspective view of the data analyzer.

Referring to the drawings, a flat ring-like element 10 is adapted to rest on a desk, table, tripod or any other suitable support. Element 10 may be formed of iron and marked off in degrees of the compass. Bars 11 and 12, which may be magnets, are adapted to be adjustably secured to the element 10. The bars 11 and 12 have vertical columns 13 and 14, respectively, secured to them at points near one end. These columns may be marked in terms of gravity as well as in terms of elevation. Slides 15 and 16 are adapted to move along the columns 13 and 14, respectively, and be secured in adjusted position by thumb screws 17 and 18. Slides 15 and 16 also slidably engage other rods 19 and 20, respectively. Rods 19 and 20 may also be pivotally adjustable with respect to the columns 13 and 14. Additional slides 21 and 22 are pivotally secured to the rods 19 and 20. The slides are adapted to pivot about an axis that coincides with the longitudinal axes of rods 19 and 20. Slides 21 and 22 are adapted to receive mechanical links 23 and 24 and maintain them at right angles to the scales 19 and 20. A third mechanical link 25 has one end pivotally secured at the center 26 of the ring-like element 10. Ends 27 and 28 of links 23 and 24 are pivotally connected to a slide 29 that is adapted to move along the link 25.

In operation line 30 represents the scaled-down horizontal distance between gravity stations $G_1$ and $G_3$ and line 31 represents the scaled-down horizontal distance between gravity stations $G_1$ and $G_2$. Slides 15 and 16 represent elevation-wise the positions of gravity meters at stations $G_3$ and $G_2$, respectively, relative to the base station $G_1$. Corrections for the various effects can be made with these slides. Rods 19 and 20 are directed toward the base station $G_1$ and extend from slides 15 and 16 toward the base station $G_1$. The distance that rod 19 extends toward the base station is determined by subtracting the gravity reading at station $G_3$ from that made at $G_1$; dividing the result by the slant height of the gravity meter, measured in a straight line from the base station $G_1$; and subtracting this quotient from the slant height. The distance that scale 20 extends toward the base station $G_1$ is similarly determined. Positioning rods 19 and 20 automatically adjusts the slide 29 on link 25. It can be demonstrated mathematically that the adjusted position of slide 29 determines both the horizontal and vertical gradients of gravity. The vertical gradient is found by measuring the line 32 which is a perpendicular that has been dropped from the slide 29 to a horizontal plane which passes through the base station $G_1$ and the horizontal gradient is found by measuring the line 33 which connects the base station $G_1$ with the foot of the perpendicular 32.

It can be seen from the drawings that the principal vector of gravitational force, represented by that portion of the link 25 lying between point 26 and the slide 29, is a diameter of a sphere and that points represented by the pivot 26, slides 21, 22 and 29, as well as point C′, all fall on its surface.

Although the device is illustrated applied to the solution of a problem involving gravitational forces at three stations, two of which are at a greater elevation than the selected base station, it finds equal application to the solution of problems involving a greater number of stations. It is equally effective in the solution of problems involving one or more stations that are at elevations that are lower than the base station. For example, the base station could be an intermediate station in a line of stations extending up and down a hill side or incline.

Although the present invention has been described in connection with geophysical prospecting for oil-bearing anomalies, it is obvious to those skilled in the art that it finds application in the fields of geodesy and mining.

I claim:

Apparatus for the mechanical determination of the vertical and horizontal gradients of gravitational force at a selected one of a plurality of spaced apart gravity measuring stations, at least one of which is spaced vertically from the selected station comprising; a selected station simulator composed of a fixed center and a base plane surface in which said center lies; two station simulators for representation of stations whose distance and altitude relation to the selected station are known, each station simulator having a base whereby the simulators may be placed upon the base plane at points representative of their relation to the selected station and to each other, each simulator having a vertical column member calibrated to the same preselected scale as used in distance setting of the station simulators upon the plane; upon each vertical column a clamp adapted to be fixed at a height representing the elevation of the station simulated with respect to the selected station; a gravity indicating rod slidably mounted in each clamp and adapted to be extended therefrom toward the fixed center upon said base plane in a line passing through said center; which line is the slant height of the simulated station with respect to the selected station; upon the inboard end of each of said rods a socket adapted to slidably retain an extension rod and permit its movement in a plane perpendicular to the axis of said gravity indicating rod; an extension rod so mounted upon each gravity indicating rod, the two extension rods being pivotally attached at their outboard ends to a slider joint member; and a gradient vector rod pivotally attached at the fixed center of the base plane and extending outwardly and slidably through the slider joint member, whereby, when the gravity indicating rods are extended toward the fixed center along the slant height line connecting the simulated station and the selected station to a distance according to the preselected scaling of the apparatus, which distance is the slant height diminished by the quantity ($G_1-G_x$ divided by slant height) where $G_x$ is the gravity reading at the simulated station and $G_1$ is the gravity reading at the selected station, the gradient vector rod will be caused to assume a position such that the horizontal and vertical ordinates of any point along its length, with respect to the base plane, are proportional to the horizontal and vertical gradients of gravity at the selected station.

References Cited in the file of this patent

UNITED STATES PATENTS 2,044,079     Karcher _____ June 16, 1936